US009841571B1

United States Patent
Momtahan (10) Patent No.: US 9,841,571 B1
(45) Date of Patent: Dec. 12, 2017

(54) OPTICAL COUPLING SYSTEM THAT REDUCES BACK REFLECTION AND IMPROVES MODE MATCHING IN FORWARD OPTICAL COUPLING USING PERTURBATIONS AT A REFLECTIVE SURFACE

(71) Applicant: Foxconn Interconnect Technology Limited, Grand Cayman (KY)

(72) Inventor: Omid Momtahan, Palo Alto, CA (US)

(73) Assignee: Foxconn Interconnect Technology Limited, Grand Cayman (KY)

( * ) Notice: Subject to any disclaimer, the term of this patent is extended or adjusted under 35 U.S.C. 154(b) by 0 days.

(21) Appl. No.: 15/417,328

(22) Filed: Jan. 27, 2017

(51) Int. Cl.
*G02B 6/42* (2006.01)
*G02B 6/14* (2006.01)

(52) U.S. Cl.
CPC .......... *G02B 6/4207* (2013.01); *G02B 6/14* (2013.01); *G02B 6/4206* (2013.01); *G02B 6/4214* (2013.01); *G02B 6/4255* (2013.01)

(58) Field of Classification Search
CPC ...... G02B 6/4207; G02B 6/14; G02B 6/4206; G02B 6/4214; G02B 6/4255; G02B 6/42
See application file for complete search history.

(56) References Cited

U.S. PATENT DOCUMENTS

| | | |
|---|---|---|
| 6,530,697 B1 | 3/2003 | Johnson et al. |
| 6,668,113 B2 | 12/2003 | Togami et al. |
| 6,807,336 B2 | 10/2004 | van Haasteren |
| 6,822,794 B2 | 11/2004 | Coleman et al. |
| 6,961,489 B2 | 11/2005 | Cox et al. |
| 7,149,383 B2 | 12/2006 | Chen |
| 7,184,627 B1 * | 2/2007 | Gunn, III ........... G02B 6/12004 359/34 |
| 7,206,140 B2 | 4/2007 | Wong et al. |
| 7,457,343 B2 | 11/2008 | Vancoille |
| 8,385,005 B2 | 2/2013 | Smith |
| 8,442,365 B2 | 5/2013 | Graham |
| 2006/0098292 A1 * | 5/2006 | Wong ....................... G02B 3/04 359/629 |
| 2016/0124149 A1 | 5/2016 | Chen et al. |

* cited by examiner

*Primary Examiner* — Andrew Jordan (57) ABSTRACT

An optical coupling system and method are provided for coupling light from a light source into an optical fiber that reduce back reflection of light into the light source and provide controlled launch conditions that improve forward optical coupling. The optical coupling system comprises at least one flat surface having perturbations formed therein over at least a portion of the flat surface that intersects an optical pathway. The perturbations have a lateral width and a height that are preselected to increase forward optical coupling efficiency and to decrease back reflection of the light beam from the optical fiber end face into the light source. The perturbations improve forward optical coupling by creating a complex light beam shape that is preselected to better match a spatial and angular distribution of a plurality of light modes of the optical fiber.

20 Claims, 9 Drawing Sheets

OPTICAL COUPLING SYSTEM THAT REDUCES BACK REFLECTION AND IMPROVES MODE MATCHING IN FORWARD OPTICAL COUPLING USING PERTURBATIONS AT A REFLECTIVE SURFACE

TECHNICAL FIELD OF THE INVENTION

The invention relates to optical communications modules and, more particularly, to an optical coupling system for use in an optical communications module that reduces back reflection of the light beam being launched into the end face of an optical waveguide while improving mode matching between the modes of the light beam and the modes of the optical waveguide.

BACKGROUND OF THE INVENTION

In optical communications networks, optical communications module (i.e., optical transceiver, transmitter and receiver modules) are used to transmit and receive optical signals over optical waveguides, which are typically optical fibers. An optical transceiver module includes a transmitter side and a receiver side. On the transmitter side, a laser light source generates a laser light beam and an optical coupling system receives the laser light beam and optically couples the laser light beam onto an end face of an optical fiber. The laser light source typically comprises one or more laser diodes that generate light beams of a particular wavelength or wavelength range. A laser diode driver circuit of the transmitter side outputs electrical drive signals that drive the laser diode. The optical coupling system typically includes one or more reflective, refractive and/or diffractive elements that couple the modulated light beam onto the end face of the optical fiber. On the receiver side, optical signals passing out of the end face of the optical fiber are optically coupled by an optical coupling system onto a photodiode, such as a P-intrinsic-N(P-I-N) diode, for example, by an optical coupling system of the transceiver module. The photodiode converts the optical signal into an electrical signal. Receiver circuitry of the receiver side processes the electrical signal to recover the data. The transmitter and receiver sides may use the same optical coupling system or they may use separate optical coupling systems.

In high-speed data communications networks (e.g., 10 Gigabits per second (Gb/s) and higher), certain link performance characteristics, such as relative intensity noise (RIN), for example, are dependent on properties of the laser light source and on the design of the optical coupling system. In most optical fiber applications, a trade-off exists between forward optical coupling efficiency of laser light from the laser light source into the end face of the optical fiber and back reflection of laser light from the end face of the optical fiber onto the laser light source. Back reflection increases RIN and degrades the performance of the laser light source. As optical communications links utilize increasingly higher data rates, reducing RIN becomes increasingly important. In optical links that use multimode laser light sources and multimode optical fibers (MMFs), it is desired to improve the mode matching between the laser modes and the fiber modes in the forward coupling to increase the link distance and reduce the sensitivity of the link to mode partition noise.

The traditional approaches for managing back reflection include using an edge-emitting laser diode with a fixed-polarization output beam in conjunction with an optical isolator, or using an angular offset launch in which either an angled fiber in a pigtailed transceiver package or a fiber stub is used to direct the light from the light source onto the end face of the link fiber at a non-zero degree angle to the optical axis of the link fiber. These approaches have advantages and disadvantages. The optical isolator may not have the desired effect if used with a laser light source that has a variable-polarization output beam, such as a vertical cavity surface emitting laser diode (VCSEL). Using an angled fiber pigtail or fiber stub can increase the complexity and cost of the transceiver packaging. Also, such approaches may not be suitable for applications where a standard optical fiber needs to be used.

A need exists for an optical coupling system for coupling a laser light beam onto an end face of an optical fiber that enables efficient coupling to many fiber modes while also reducing back reflections and, therefore, reducing RIN.

SUMMARY OF THE INVENTION

The inventive principles and concepts are directed to an optical coupling system for coupling a light beam produced by a light source onto an end face of an optical waveguide and a method. The optical coupling system comprises a flat surface positioned along an optical pathway of the optical coupling system and a plurality of perturbations disposed on an outer side of the flat surface. A light beam propagating along an optical pathway of the optical coupling system in a first direction is incident on an inner side of the flat surface having the perturbations formed therein. Each perturbation has a localized sagittal (sag) profile that provides a localized refractive effect on a portion of the light beam that is incident on the flat surface to form a respective light beam portion at a predetermined plane. The perturbations are shaped, sized and positioned such that a predetermined aggregated refractive effect of partially or fully overlapping all of the respective light beam portions at the predetermined plane forms a complex light beam shape at the predetermined plane that is different in shape from respective shapes of each of the respective light beam portions. The complex light beam shape is preselected to match one or more light modes of the light beam emitted by the light source with one or more light modes of the optical fiber. The complex light beam shape can also be preselected to reduce back reflections of the light beam from the end face of the optical waveguide into the light source.

The method comprises:
  with a light source, producing a light beam; and
  with an optical coupling system, receiving the light beam and guiding the light beam in a first direction along an optical pathway of the optical coupling system and causing the light beam to be incident on an inner side of a flat surface of the optical coupling system. A plurality of perturbations are disposed on an outer side of the flat surface, where each perturbation has a localized sag profile that provides a localized refractive effect on a portion of the light beam that is incident on the flat surface to form a respective light beam portion at a predetermined plane. The perturbations are shaped, sized and positioned such that a predetermined aggregated refractive effect of partially or fully overlapping all of the respective light beam portions at the predetermined plane forms a complex light beam shape at the predetermined plane that is different in shape from a respective shape of each of the respective light beam portions. The complex light beam shape is preselected to match one or more light modes of the laser light beam emitted by the light source with one or more light modes of the optical fiber. The complex light beam shape can also be preselected to reduce back reflections of the light beam from the end face of the optical waveguide onto the light source.

These and other features and advantages of the invention will become apparent from the following description, drawings and claims.

DETAILED DESCRIPTION OF AN ILLUSTRATIVE EMBODIMENT

In accordance with the illustrative, or exemplary, embodiments described herein, an optical coupling system and method are provided for use in an optical communications module that improve forward optical coupling through better mode matching between the laser modes and the fiber modes and reduce back reflection into the laser. The optical coupling system has at least one flat surface having perturbations formed therein over at least a portion of the flat surface that intersects an optical pathway of the optical coupling system. The perturbations have a lateral width and a height that are preselected to improve forward optical coupling efficiency through better mode matching between the laser modes and the fiber modes and to decrease back reflection into the laser. The flat surface having the perturbations formed therein operates on the laser light beam in a predetermined manner to control the launch of the laser light beam onto the end face of the optical waveguide in a predetermined manner that improves mode matching and reduces back reflection into the laser.

In some representative embodiments, the flat surface having the perturbations formed therein comprises an air-to-material interface of the optical coupling system such that the laser light beam passing from air into the material of which the optical coupling system is made interacts with the perturbations as it passes from the air into the material. In some representative embodiments, the flat surface having the perturbations formed therein comprises a material-to-air interface of the optical coupling system such that the laser light beam passing from the material of which the optical coupling system is made into the air interacts with the perturbations as it passes from the material into the air. In some representative embodiments, the flat surface having the perturbations formed therein comprises a flat total internal reflection (TIR) surface of the optical coupling system such that the laser light beam that is incident on the flat TIR surface interacts with the perturbations as it is turned, reflected, by the flat TIR surface. Illustrative, or representative, embodiments will now be described with reference to FIGS. 1-11, in which like reference numerals represent like features, components or elements.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature. More particularly, the word "representative" as used herein indicates one among several examples, and it must be understood that no undue emphasis or preference is being directed to the particular example being described. It should also be understood that the word "representative," as used herein, is intended to be non-exclusionary and non-limiting in nature. More particularly, the word "representative," as used herein, indicates one among several examples, and no undue emphasis or preference is being directed to the particular example being described.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "an element" includes one element and plural elements. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The terms "approximately" or "about" means to within an acceptable limit or amount to one of ordinary skill in the art. Relative terms, such as "over," "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element. Where a first device is said to be connected or coupled to a second device, this encompasses examples where one or more intermediate devices may be employed to connect the two devices to each other. In contrast, where a first device is said to be directly connected or directly coupled to a second device, this encompasses examples where the two devices are connected together without any intervening devices other than connectors (e.g., bonding materials, mechanical fasteners, etc.).

Figure 1:
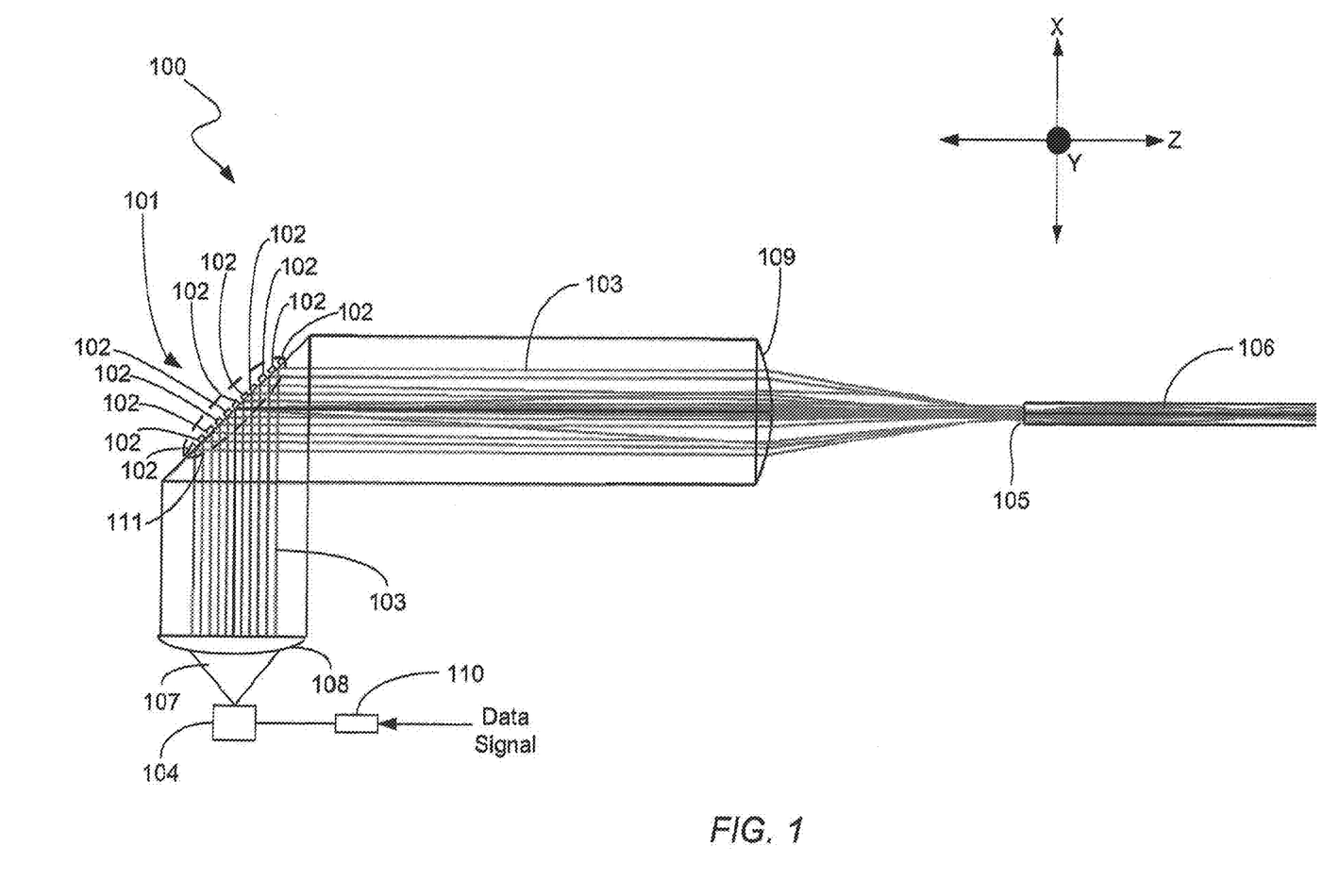
FIG. 1 illustrates a side view of a portion of an optical coupling system in accordance with a representative embodiment having a flat total internal reflection (TIR) surface in which a plurality of perturbations are formed.

FIG. 1 illustrates a side view of a portion of an optical coupling system 100 in accordance with a representative embodiment having a flat TIR surface 101 in which a plurality of the perturbations 102 are formed. The term "total internal reflection" or "TIR," as those terms are used herein, denote a phenomenon that occurs when a light beam propagating in an optical coupling system is incident on a surface of the optical coupling system at an angle larger than a particular critical angle with respect to a normal to the surface, where the medium on the opposite side of the surface has a lower refractive index than the material of which the surface is made, thereby causing substantially all of the light beam to be reflected from the surface. The term "TIR surface," as that term is used herein, denotes a surface that acts as a TIR reflector, or lens, such that substantially all of a light beam that is incident on the TIR surface at an angle greater than the critical angle experiences TIR and is reflected off of the TIR surface. The term "flat TIR surface," as that term is used herein, denotes a TIR surface that has no curvature, or substantially no curvature.

The optical coupling system 100 optically couples a laser light beam emitted by a laser light source 104 onto an end face 105 of an optical fiber 106. As will be described below in more detail with reference to FIG. 2, each of the perturbations 102 has a predetermined width and a predetermined height that are preselected to provide a localized refractive effect on a laser light beam that is incident on the flat TIR surface 101.

The laser light source 104 may be, for example, a vertical cavity surface emitting laser diode (VCSEL) or an edge-emitting laser diode, although the inventive principles and concepts are not limited to using any particular type of light source. For exemplary purposes, it will be assumed that the light source is a laser light source.

A laser light source driver circuit 110 receives a data signal at its input and converts the data signal into a modulated current or voltage signal that drives the laser light source 104, causing it to emit a modulated optical signal 107. The inventive principles and concepts are also not limited with respect to the laser drive circuit 110 that is used for this purpose or with respect to the modulation method that is used to modulate the laser light beam to produce the modulated optical signal 107. In accordance with this representative embodiment, the modulated optical signal 107 is a diverging optical signal that is collimated by a refractive lens 108 of the optical coupling system 100 into a collimated laser light beam 103. The flat TIR surface 101 having the perturbations 102 formed therein, referred to hereinafter as the "perturbed flat TIR surface 101," receives the collimated, or nearly collimated, laser light beam 103 and turns it, or reflects it, by a predetermined non-zero-degree angle, which is a 90° angle in this example.

In FIG. 1, the optical coupling system 100 is shown with reference to an X, Y, Z Cartesian coordinate system. Prior to being incident on the perturbed flat TIR surface 101, the collimated laser light beam 103 propagates in the X-direction away from the laser light source 104 toward the perturbed flat TIR surface 101. The perturbed flat TIR surface 101 turns the collimated laser light beam by 90° in this representative embodiment and directs the laser light beam in the Z-direction toward the end face 105 of the optical fiber 106. It should be noted that the inventive principles and concepts are not limited with respect to the angle by which the perturbed flat TIR surface 101 turns light. A focusing lens 109 of the optical coupling system 100 receives the collimated laser light beam 103 propagating in the Z-direction and couples the laser light beam 103 onto the end face 105 of the optical fiber 106.

Each of the perturbations 102 of the perturbed flat TIR surface 101 receives a portion of the collimated laser light beam 103 and operates on it locally to change the location of coupling of the respective portion of the collimated laser light beam 103 on the end face 105 of the optical fiber 106. As will be described below in more detail, the perturbed flat TIR surface 101 has flat surface portions on either side of each of the perturbations 102. The portion of the collimated laser light beam 103 that are reflected by each perturbation 102 will couple differently onto the end face 105 than the portions of the collimated laser light beam 103 that are reflected by the flat surface portions located on either side of the respective perturbation 102. The aggregated effect of these differences in the way that the flat surface portions and the perturbations couple respective portions of the collimated laser light beam 103 onto the end face 105 results in the shape of the focused laser light beam on the end face 105 of the optical fiber 106 being different than it would have been had the flat TIR surface 101 not had the perturbations 102 formed therein.

For example, instead of the collimated laser light beam 103 being coupled in the shape of a small circular disk onto the end face 105, the collimated laser light beam 103 is coupled onto the end face as a complex beam shape comprising multiple beam shapes that are adjacent one another or that partially overlap one another on the end face 105. The complex beam shape results in less light being reflected from the end face 105 back onto the laser light source 104 and improved forward optical coupling through improved mode matching between the modes of the laser light beam 103 and the modes of the optical fiber 106. As will be described below in more detail, the complex beam shape is tailored to ensure that modes of the laser light beam match modes of the optical fiber 106 to improve forward optical coupling.

Figure 2:
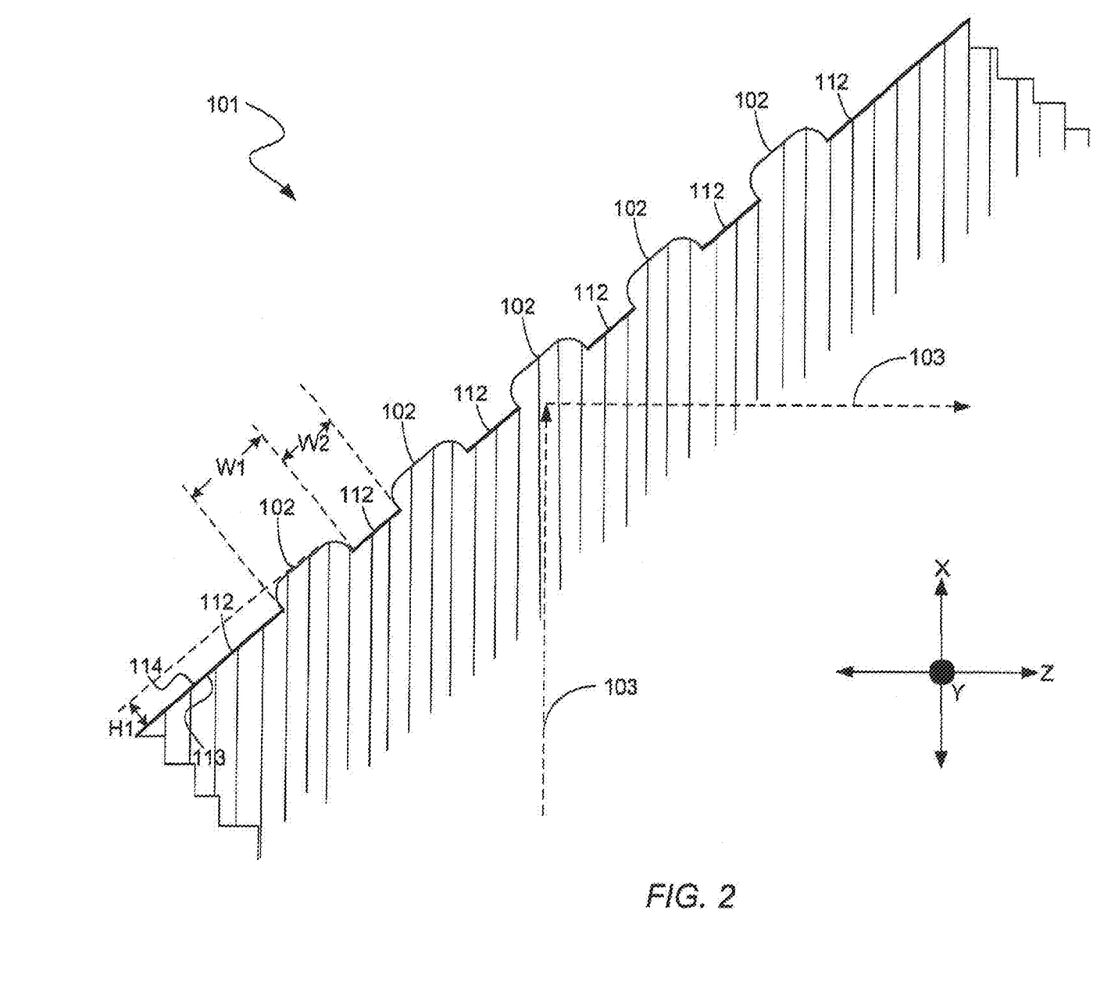
FIG. 2 illustrates a cross-sectional side view of the portion of the flat TIR surface having the perturbations formed therein shown in the dashed circle labeled with reference numeral 111 in FIG. 1.

FIG. 2 illustrates a cross-sectional side view of the portion of the perturbed flat TIR surface 101 shown in the dashed circle labeled with reference numeral 111 in FIG. 1. The perturbations 102 of the perturbed flat TIR surface 101 are separated from one another by flat portions 112 of the TIR surface 101. The perturbed flat TIR surface 101 has an inner side 113 and an outer side 114. The material comprising the perturbed flat TIR surface 101 preferably is a plastic optical material such as ULTEM™ polyetherimide, for example, that is transparent to the operating wavelength of light of the optical communications device (not shown) in which it is used. ULTEM™ polyetherimide is a product of Saudi Arabia Basic Industries Corporation (SABIC) of Saudi Arabia. As will be described below in more detail, the perturbed flat TIR surface 101 is typically formed via a plastic molding process. Typically, the perturbed flat TIR surface 101 is an integral part of the optical coupling system 100 and the optical coupling system 100 is monolithically formed as a unitary piece part, e.g., as a single plastic molded part having the perturbed flat TIR surface 101 and other optical components or features integrally formed therein.

In accordance with this representative embodiment, the perturbed flat TIR surface 101 is a periodic structure in that the perturbations 102 all have the same height, H1, and the same width, W1, and the flat portions 112 all have the same width, W2. However, in other embodiments, the perturbations 102 may not all of the same height and width and the flat portions 112 that separate the perturbations 102 from one another may or may not have the same width. The width W1 of each perturbation 102 extends laterally, or transversely, relative to the laser light beam that is being operated on by the perturbed flat TIR surface 101. The perturbations 102 may be arranged in a 1-by-N array, a 2-by-N array or an M-by-N array, where M and N are positive integers that are greater than or equal to 2 and where M and N may or may not be equal to one another.

The maximum height H1 of the perturbations 102 relative to the flat portions 112 in the direction normal to the outer side 114 ranges from 0 to about 10λ, where λ is the operating wavelength in the air of the optical communications device (not shown) in which the optical coupling system 100 is used. The perturbations 102 have a width W1 in the direction parallel to the outer side 114 that ranges from 60λ to 400λ. This range of dimensions for the perturbations 102 ensures that they provide refractive effects and ensures that they are too large to provide any diffractive effect. In order to provide diffractive effects, the widths of the perturbations 102 would need to be comparable to λ (i.e., from a fraction of λ to about 10λ). Because the width W1 ranges from about 60λ to 400λ, the perturbations 102 are designed to provide refractive effects rather than diffractive effects, i.e., diffractive effects are nonexistent or negligible.

As will be described below in more detail with reference to FIGS. 5-7, each of the perturbations 102 acts as a respective TIR lens that changes the focus location of that portion of the reflected beam compared to where the focus location would have been if that perturbation 102 were replaced by a flat portion 112. Thus, the flat portions 112 focus the reflected light beam at locations that are different from where the perturbations 102 focus the reflected light beam. The result is a complex light beam shape, or profile, compared to that which would occur in the absence of the perturbations 102. The complex light beam shape reduces back reflection into the light source and also achieves a level of mode matching between the modes of the laser light produced by the laser light source 104 and the modes of the fiber 106 into which the laser light is coupled, thereby increasing forward coupling efficiency and reducing RIN.

The perturbations 102 reduce back reflection as follows. Back reflected light is passing through perturbed flat TIR surface 101 for a second time, which results in a modified and complex light beam profile arriving at the laser light source 104 with minimal, if any, light coupling into the active area of the laser light source 104, thereby reducing RIN. Back-reflected light typically passes through a perturbation 102 that is different from the perturbation 102 that the same light passed through when it propagated in the forward direction. This results in the an increase in the complexity of the complex light beam profile arriving at the laser light source 104, which further reduces the amount of back-reflected light that is coupled into the laser light source 104.

In general, the perturbations 102 result in a complex light beam shape being formed at a plane occurring close to a plane where the reflected light beam is focused. The plane in which the complex light beam shape occurs is the same plane in which the end face 105 of the optical fiber 106 lies. In other words, the complex light beam shape is incident on the end face 105 of the optical fiber 106. The perturbed flat TIR surface 101 has a predetermined structure that is designed to achieve the complex light beam shape at the end face 105 of the optical fiber 106. To demonstrate the complex light beam shape, a comparison will be made between a typical beam shape and an example of the complex light beam shape with reference to FIGS. 3-7.

The term "complex light beam shape," as that term is used herein, denotes a light beam shape made up of at least two light beam portions that are adjacent to one another or overlap one another fully or partially at a predetermined plane to form a light beam shape at the predetermined plane that is different from each of the light beam portions. Each perturbation has a localized refractive effect on a portion of the light beam that is incident on the perturbed flat TIR surface 101 to form a respective light beam portion. The perturbations are shaped, sized and positioned such that a predetermined aggregated refractive effect of all of the localized refractive effects forms a complex light beam shape at the predetermined plane.

Figure 3:
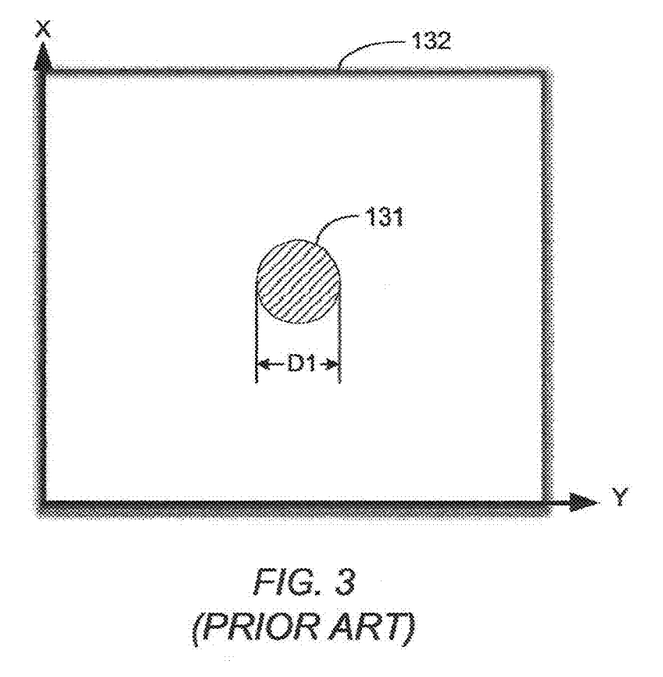
FIG. 3 illustrates a front plan view of a light beam shape brought to focus by a known focusing lens of a known optical coupling system in a plane that is different from, but parallel to, a plane in which the end face of the optical fiber lies.
Figure 4:
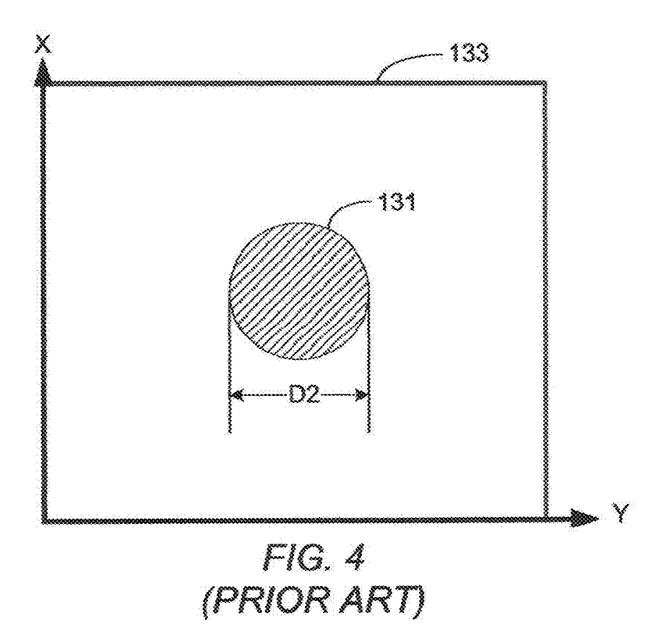
FIG. 4 illustrates a front plan view of the light beam shape shown in FIG. 3 brought to near focus in a plane in which an end face of an optical fiber lies.

FIG. 3 illustrates a front plan view of a light beam shape 131 brought to focus in a plane 132 by a known focusing lens (not shown) of a known optical coupling system (not shown). FIG. 4 illustrates a front plan view of the light beam shape 131 shown in FIG. 3 brought to near focus in a plane 133 in which an end face of an optical fiber (not shown) lies. The light beam shape 131 shown in FIGS. 3 and 4 is that of a circular disk, which is a typical light beam shape for a light beam being launched onto an end face of an optical fiber in a typical optical transmitter device (not shown).

In a typical known optical communications system, the plane in which the end face of the optical fiber lies is typically parallel to, but not coplanar with, the plane in which the light beam is brought to focus. The plane in which the end face of the optical fiber lies is typically farther away from the optical coupling system than the plane in which the light beam is brought to focus. The light beam shape 131 shown in FIG. 3 has a diameter, D1, that is smaller than the diameter, D2, of the light beam shape 131 shown in FIG. 4 due to the fact that the light beam shape 131 shown in FIG. 3 is at focus whereas the light beam shape 131 shown in FIG. 4 has passed its focal point. The end face of the optical fiber is typically, but not necessarily, coplanar with the plane 133 shown in FIG. 4 because the light beam shape 131 having diameter D2 couples light into a larger number of light modes of the optical fiber than the light beam shape 131 shown in FIG. 3 having diameter D1.

Figure 5:
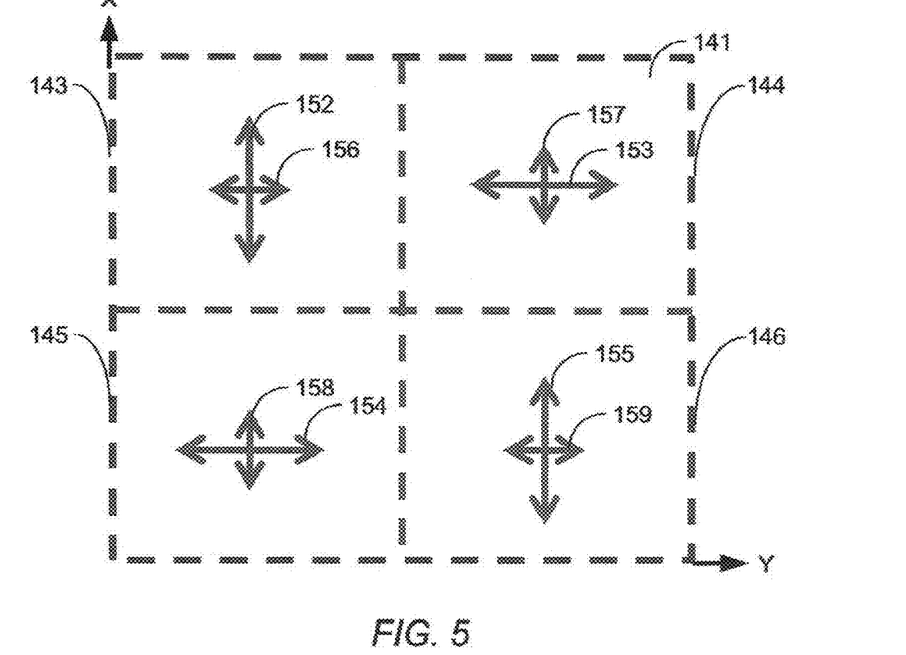
FIG. 5 illustrates a plan view of a perturbed TIR surface comprising a two-by-two array of the perturbations shown in FIGS. 1 and 2 in accordance with a representative embodiment in which each perturbation is a small biconic lens.

FIG. 5 illustrates a plan view of a perturbed flat TIR surface 141 comprising a two-by-two array of the perturbations 102 shown in FIGS. 1 and 2 in accordance with a representative embodiment in which each perturbation 102 is a small biconic lens. Each of the dashed blocks 143-146 of the array has a respective biconic lens in the center thereof. In this example, the longer arrows 152-155 in each of the blocks 143-146, respectively, represent a first curvature of the respective biconic lens and the shorter arrows 156-159 in each of the blocks 143-146, respectively, represent a second curvature of the respective biconic lens that is smaller than the first curvature. The complex light beam shape created by the perturbed flat TIR surface 141 at focus and near focus will now be described with reference to FIGS. 6 and 7, respectively.

Figure 6:
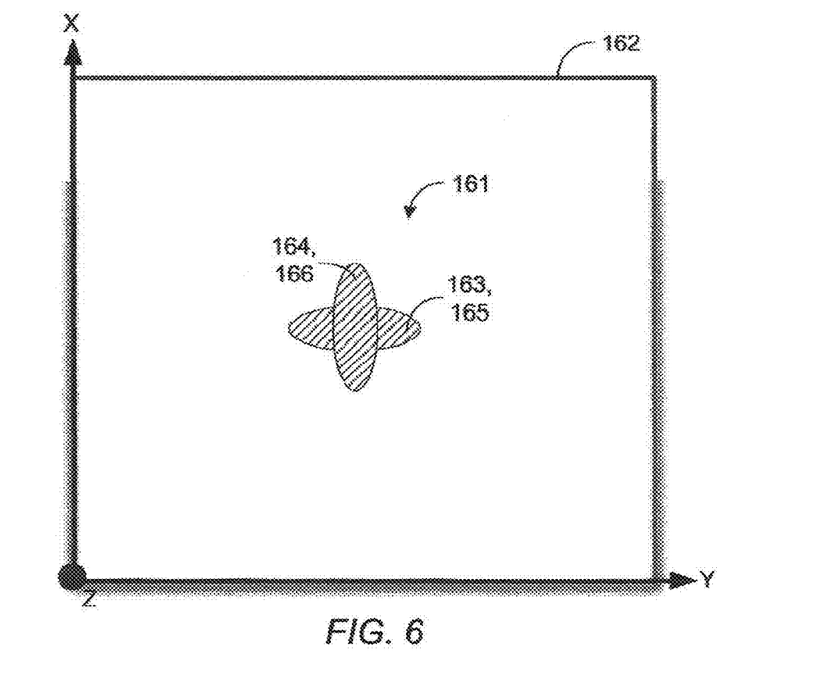
FIG. 6 illustrates a front plan view of a complicated light beam shape formed by bringing four light beams created by the biconic lenses of dashed blocks 143-146 shown in FIG. 5 to focus in a plane.

FIG. 6 illustrates a front plan view of a complex light beam shape 161 formed by bringing four light beam portions 163-166 created by the biconic lenses of dashed blocks 143-146 shown in FIG. 5, respectively, to focus in a plane 162. For simplicity, FIG. 6 only shows the boarders of each of the light beam portions 163-166 and does not show actual intensity variations of the light over the respective light beam portions 163-166. Also, for simplicity fringes of the light beam portions 163-166 that could be formed due to the coherent nature of the beam portions propagating along slightly different optical paths and interfering at plane 162. In actual applications, the aggregate beam profile will be even more complicated because of those interferences. The light beam portions 163 and 165 of the complex light beam shape 161 correspond to the full overlapping of respective light beam portions formed at focus by the biconic lenses centered in dashed blocks 144 and 145, respectively. The light beam portions 164 and 166 of the complicated light beam shape 161 correspond to the full overlapping of respective light beam portions formed at focus by the biconic lenses centered in dashed blocks 143 and 146, respectively.

Figure 7:
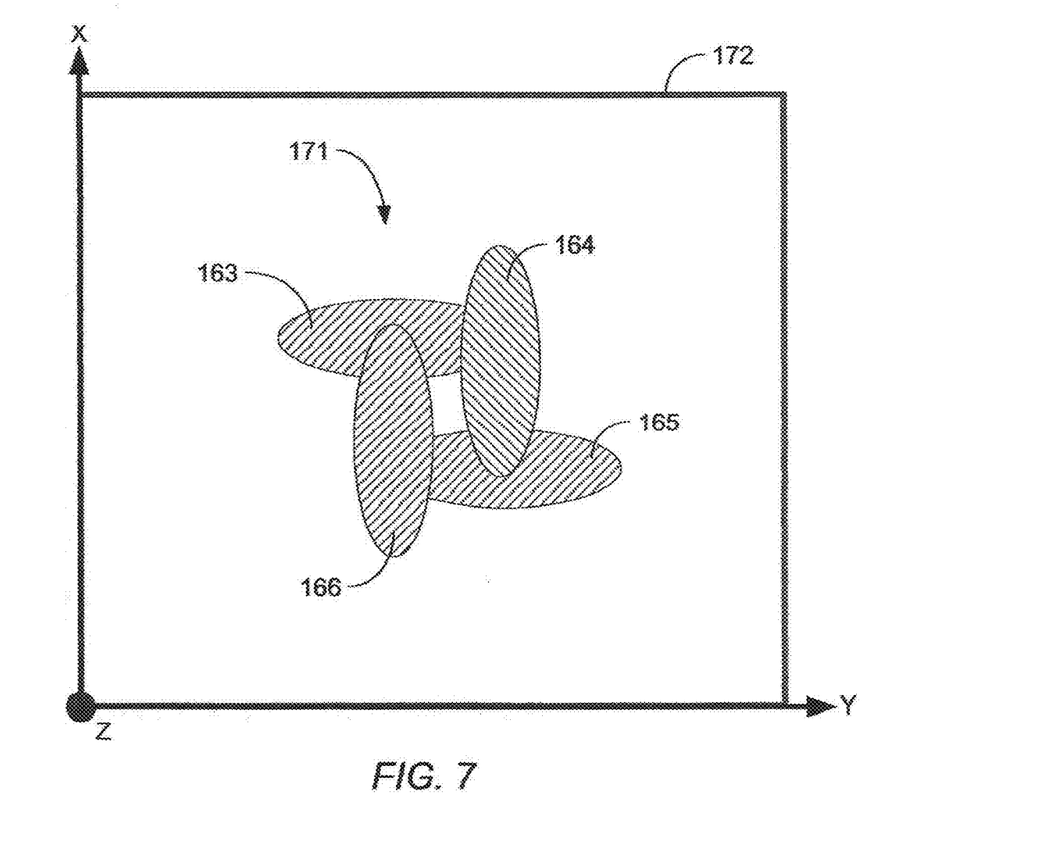
FIG. 7 illustrates a front plan view of a complicated light beam shape formed by bringing the four light beams created by the four biconic lenses of dashed blocks 143-146 shown in FIG. 5 to near focus in a plane that is closer to the perturbed TIR surface shown in FIG. 5 or farther from the perturbed TIR surface shown in FIG. 5 than the plane shown in FIG. 6 in the Z-direction.

FIG. 7 illustrates a front plan view of a complex light beam shape 171 formed by bringing the four light beam portions created by the four biconic lenses of dashed blocks 143-146 shown in FIG. 5, respectively, to near focus in a plane 172. The plane 172 is closer to or farther from the perturbed flat TIR surface 141 shown in FIG. 5 than the plane 162 shown in FIG. 6 in the Z-direction (normal to the drawing pages containing FIGS. 6 and 7). In the case where, for example, each of the perturbations is a concave biconic lens, the plane 172 is farther from the perturbed flat TIR surface 141 shown in FIG. 5 than the plane 162 shown in FIG. 6 in the Z-direction. The light beam portions 163, 164, 165 and 166 comprising the complex light beam shape 171 correspond to the partial overlapping of the light beam portions 163-166 created at near focus by the biconic lenses centered in dashed blocks 143-146. Because the biconic lenses are at different spatial locations in the perturbed flat TIR surface 141, the respective light beam portions 163-166 are formed at different locations in the plane 172 at near focus.

Ideally, the light beam shape that is incident on the end face of the optical fiber has both the spatial and angular distribution of all of the light modes of the optical fiber in order to achieve optimum forward optical coupling. However, this is very difficult to achieve using typical optical coupling systems. The complex light beam shapes 161 and 171 shown in FIGS. 6 and 7, respectively, are predetermined to have spatial and angular distributions at the fiber end face that match enough of the light modes of the optical fiber to achieve good forward optical coupling that is less sensitive to mode partition noise. Thus, the size, shape and spatial arrangement of the perturbations 102 (FIGS. 1 and 2) on the perturbed flat TIR surface 101 are preselected to obtain a complex light beam shape at a preselected plane that is coplanar, or at least substantially coplanar, with the fiber end face and that is at or near focus in order to match spatial and angular distributions of the optical fiber light modes, thereby achieving good forward optical coupling.

In addition, any of the light comprising the complex light beam shape 171 that is back reflected from the end face of the fiber passes through the features that exist on the perturbed flat TIR surface 101, including the perturbations 102. Each portion of the back-reflected beam will experience a different refractive effect as it passes through the perturbed flat TIR surface 101, and as a result, the final beam arriving at the laser light source 104 will have an even more complex pattern. Moreover, the size of such a complex beam will be large as the fiber end face is not at the focus of the forward beam. Consequently, the back-reflected beam will not be at focus at the aperture of the laser light source 104. The combination of these refractive effects will significantly reduce the amount of light that is coupled back into the aperture, or active region, of the laser light source 104. The significant reduction in back reflection onto the aperture leads to a significant reduction in RIN. Thus, in accordance with the invention principles and concepts, the perturbed flat TIR surface 101 can be designed in a way that simultaneously maximizes the mode matching of the forward-coupled light beam to the fiber modes and minimizes the back reflection to the laser light source 104.

In most embodiments, the size, shape and spatial arrangement of the perturbations 102 (FIGS. 1 and 2) in the flat TIR surface 101 (FIGS. 1 and 2) are preselected to obtain a complex light beam shape at a preselected plane that is coplanar with the fiber end face and that is near focus, but not at focus, in order to match spatial and angular distributions of the optical fiber light modes, thereby achieving good forward optical coupling and reducing back reflection and RIN. For example, the complex light beam shape 171 shown in FIG. 7, which is near focus, has a more complicated spatial distribution than the complex light beam shape 161 shown in FIG. 6. The more complicated light beam shape 171 at near focus can excite more of the optical fiber light modes than the less complicated light beam shape 161 at focus. It should be noted, however, that the inventive principles and concepts are not limited with respect to the location of the preselected plane or whether or not it is at focus, near focus or otherwise.

In some embodiments, in addition to creating a complex light beam shape at or near focus, the perturbations 102 are designed to locally destroy the TIR effect of the perturbed flat TIR surface 101 over a portion of the optical pathway that extends through the flat TIR surface 101 to allow a portion of the laser light that is incident on the perturbed flat TIR surface 101 to leak through it, thereby attenuating the collimated laser light beam 103. Attenuating the collimated laser light beam 103 to achieve an optical loss of L decibels (dB) along the forward optical pathway produces a loss of 2L dB in light reflected from the fiber end face 105 back toward the laser light source 104. Therefore, while the complex light beam shape at the fiber end face 105 reduces back reflection onto the laser light source 104 to an extent, designing the perturbations 102 to locally destroy the TIR effect over a portion of the optical pathway that extends through the perturbed flat TIR lens 101 further reduces back reflection onto the laser light source 104.

While the optical coupling system 100 is an example of a structure that can incorporate the perturbed flat TIR surface 101, the perturbed flat TIR surface 101 is not limited with respect to the structure or configuration of the optical coupling system in which it is incorporated. For example, while the optical coupling system 100 shown in FIG. 1 is configured with a collimating lens 108 that converts the diverging laser light beam 107 into the collimated laser light beam 103, which is then coupled onto the perturbed flat TIR surface 101, the perturbed flat TIR surface 101 may operate on a non-collimated light beam, such as a diverging or converging light beam provided that the range of incident angles of the light beam on the perturbed flat TIR surface 101 satisfy the above-mention TIR conditions.

With reference again to FIGS. 1 and 2, the perturbed flat TIR surface 101 is typically manufactured using the same type of known plastic molding process that is used to manufacture known plastic lenses. The perturbations 102 are sufficiently large that they can be precisely formed via a known plastic molding process. Diffractive or holographic surfaces having diffractive or holographic elements formed therein are often used to couple light from a laser light source onto an end face of an optical fiber in a way that attempts to match the spatial and angular distribution of the coupled beam to multiple light modes of the optical fiber. However, because the widths of the diffractive or holographic elements must be comparable to the operating wavelength, these elements are generally too small to be formed by known plastic molding processes. Instead, such diffractive or holographic surfaces are typically formed using glass etching techniques or photolithographic techniques, which are relatively expensive to perform.

In contrast, because the perturbations 102 are relatively large compared to diffractive or holographic elements, the perturbed flat TIR surface 101 can be formed during a known plastic molding process that is used to manufacture the entire optical coupling system 100. Such known molding processes are relatively inexpensive to perform. As indicated above, the molding process results in the perturbations 102 having a maximum height H1 relative to the flat portions 112 of the perturbed TIR surface 101 that ranges from 0 to about 10λ and having a width W1 that ranges from 60λ to 400λ. Therefore, the perturbations 102 are too large to have a diffractive effect on the incident light beam and instead have a refractive effect on the incident light beam. In other words, each perturbation 102 has a localized refractive effect on a respective portion of the incident light beam, and the aggregated refractive effect of all of the perturbations 102 on the incident light beam is the formation of the aforementioned predetermined complex light beam shape on the end face 105 of the optical fiber 106 that reduces back reflection into the laser light source 104 and improves forward optical coupling through efficient mode matching.

The same aggregated refractive effect that is achieved by the perturbations of a perturbed flat TIR surface described above can be achieved by forming them on any flat surface of the optical coupling system that encounters the optical pathway of the optical coupling system, as will now be described with reference to FIGS. 8 and 9.

Figure 8:
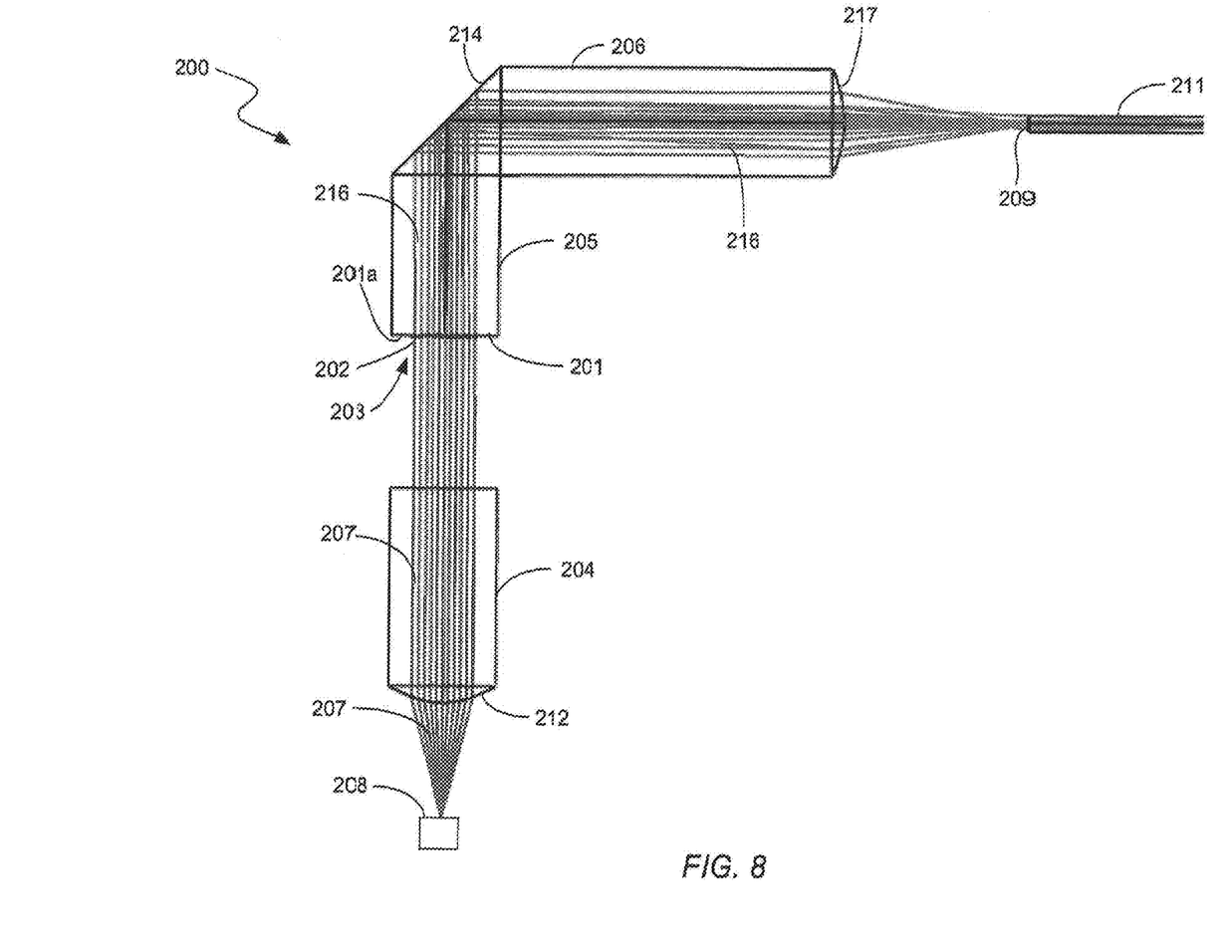
FIG. 8 illustrates a side view of a portion of an optical coupling system in accordance with a representative embodiment having a flat surface in which a plurality of perturbations are formed at an air-to-material interface of the optical coupling system.

FIG. 8 illustrates a side view of a portion of an optical coupling system 200 in accordance with a representative embodiment having a flat surface 201 having a plurality of perturbations 202 formed on an outer side 201a of the flat surface 201 at an air-to-material interface 203 of the optical coupling system 200. The flat surface 201 having the perturbations 202 formed on the outer side 201a thereof is referred to hereinafter as the "perturbed flat surface 201." In accordance with this representative embodiment, the optical coupling system 200 has first, second and third optical coupling system portions 204, 205 and 206, respectively. The optical coupling system 200 optically couples a laser light beam 207 emitted by a laser light source 208 onto an end face 209 of an optical fiber 211.

The first optical coupling system portion 204 has a collimating lens 212 integrally formed on one end thereof that collimates the laser light beam 207 and directs the collimated laser light beam 207 toward a flat TIR surface 214. At the air-to-material interface 203, the perturbations 202 operate on the collimated laser light beam 207 in the refractive manner described above with reference to FIGS. 1-7 to form a laser light beam 216 having a complex light beam shape, as that term has been defined above. The laser light beam 216 having the complex light beam shape is incident on the TIR surface 214, which turns the laser light beam 216 by a non-zero-degree angle (90° in this embodiment) and directs it toward the end face 209 of the optical fiber 211. It should be noted that, in accordance with this representative embodiment, the TIR surface 214 may instead be a reflector (e.g., reflective coating) that is reflective to the operating wavelength of the laser light beam 216. In accordance with this representative embodiment, the third optical coupling system portion 206 has a focusing lens 217 that causes the laser light beam 216 to converge to a focal point that is on the end face 209 or in front of the end face 209 (i.e., outside the optical fiber 211).

The perturbations 202 may be, but need not be, similar in shape and size to the perturbations 102 shown in FIGS. 1 and 2. Like the perturbations 102 shown in FIGS. 1 and 2, the perturbations 202 shown in FIG. 8 may be arranged in a 1-by-N array, a 2-by-N array or an M-by-N array, where M and N are positive integers that are greater than or equal to 2 and where M and N may or may not be equal to one another. At the air-to-material interface 203, each of the perturbations 202 receives a portion of the collimated laser light beam 207 and operates on it locally to change the location of coupling of the respective portion of the collimated laser light beam 207 on the end face 209 of the optical fiber 211. As described above with reference to FIGS. 1 and 2, there are flat surface portions on either side of each of the perturbations 202. The portions of the collimated laser light beam 207 that are refracted by each perturbation 202 will couple differently onto the end face 209 than the portions of the collimated laser light beam 207 that are refracted by the flat surface portions located on either side of the respective perturbation 202. The aggregated effect of these differences in the way that the flat surface portions and the perturbations 202 couple respective portions of the collimated laser light beam 216 onto the end face 209 results in the shape of the laser light beam on or in front of the end face 209 of the optical fiber 211 being different than it would have been had the flat surface 201 not had the perturbations 202 formed therein.

Figure 9:
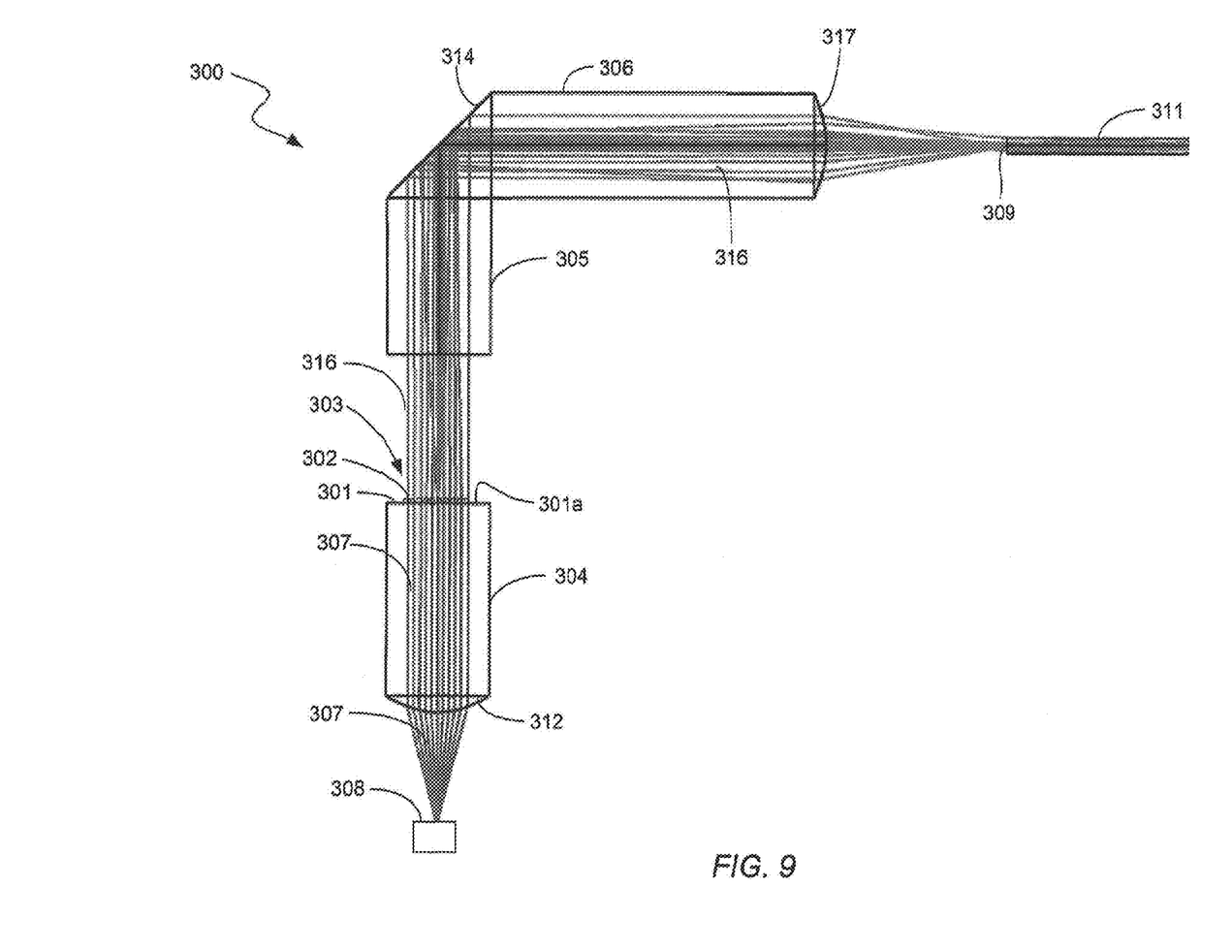
FIG. 9 illustrates a side view of a portion of an optical coupling system in accordance with a representative embodiment having a flat surface in which a plurality of perturbations are formed at a material-to-air interface of the optical coupling system.

FIG. 9 illustrates a side view of a portion of an optical coupling system 300 in accordance with a representative embodiment having a flat surface 301 having a plurality of perturbations 302 formed on an outer side 301a of the flat surface 301 at a material-to-air interface 303 of the optical coupling system 300. The flat surface 301 having the perturbations 302 formed on the outer side 301a thereof is referred to hereinafter as the "perturbed flat surface 301." In accordance with this representative embodiment, the optical coupling system 300 has first, second and third optical coupling system portions 304, 305 and 306, respectively. The optical coupling system 300 optically couples a laser light beam 307 emitted by a laser light source 308 onto an end face 309 of an optical fiber 311.

The first optical coupling system portion 304 has a collimating lens 312 integrally formed on one end thereof that collimates the laser light beam 307 and directs the collimated laser light beam 307 toward a flat TIR surface 314. At the material-to-air interface 303, the perturbations 302 operate on the collimated laser light beam 307 in the refractive manner described above with reference to FIGS. 1-8 to form a laser light beam 316 having a complex light beam shape, as that term has been defined above. The laser light beam 316 having the complex light beam shape is incident on the TIR surface 314, which turns the laser light beam 316 by a non-zero-degree angle (90° in this embodiment) and directs it toward the end face 309 of the optical fiber 311. It should be noted that, as with the embodiment shown in FIG. 8, the TIR surface 314 shown in FIG. 9 may instead be a reflector (e.g., reflective coating) that is reflective to the operating wavelength of the laser light beam 316. In accordance with this representative embodiment, the third optical coupling system portion 306 has a focusing lens 317 that causes the laser light beam 316 to converge to a focal point that is on the end face 309 or in front of the end face 309 (i.e., outside the optical fiber 311).

The perturbations 302 may be, but need not be, similar in shape and size to the perturbations 102 shown in FIGS. 1 and 2. Like the perturbations 102 shown in FIGS. 1 and 2, the perturbations 302 shown in FIG. 9 may be arranged in a 1-by-N array, a 2-by-N array or an M-by-N array. At the material-to-air interface 303, each of the perturbations 302 receives a portion of the collimated laser light beam 307 and operates on it locally to change the location of coupling of the respective portion of the collimated laser light beam 307 on the end face 309 of the optical fiber 311. As described above with reference to FIGS. 1 and 2, there are flat surface portions on either side of each of the perturbations 302. The portions of the collimated laser light beam 307 that are refracted by each perturbation 302 will couple differently onto the end face 309 than the portions of the collimated laser light beam 307 that are refracted by the flat surface portions located on either side of the respective perturbation 302. The aggregated effect of these differences in the way that the flat surface portions and the perturbations 302 couple respective portions of the collimated laser light beam 316 onto the end face 309 results in the shape of the laser light beam on or in front of end face 309 of the optical fiber 311 being different than it would have been had the flat surface 301 not had the perturbations 302 formed therein.

Figure 10:
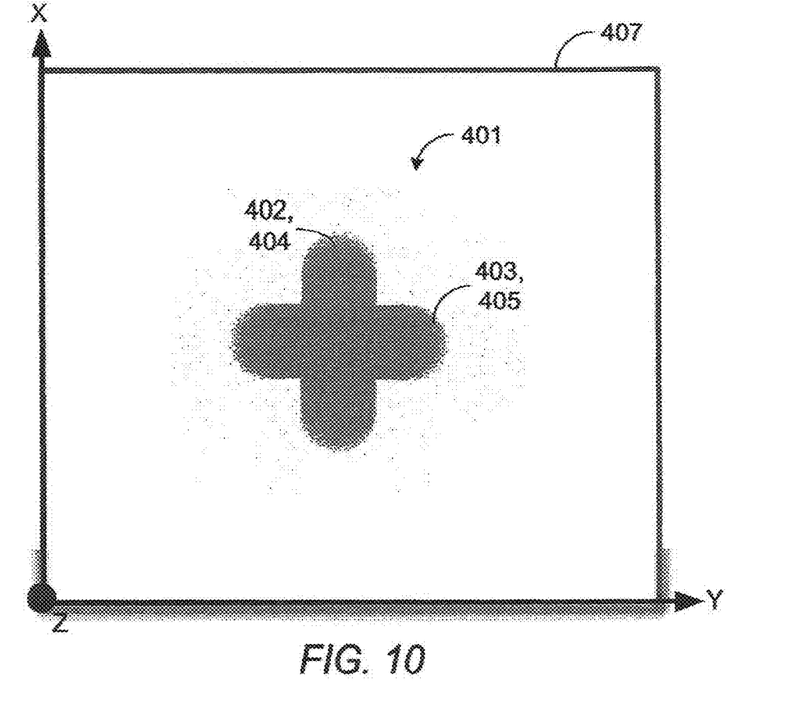
FIG. 10 illustrates a front plan view of a complex light beam shape formed by bringing four light beam portions created by four of the perturbations shown in FIG. 9 formed on the outer side of the flat optical surface disposed at the material-to-air interface shown in FIG. 9 in accordance with a representative embodiment.

FIG. 10 illustrates a front plan view of a complex light beam shape 401 formed by bringing four light beam portions 402-405 created by four of the perturbations 302 shown in FIG. 9 formed on the outer side 301a of the flat optical surface 301 at the material-to-air interface 303 shown in FIG. 9 in accordance with a representative embodiment. In the representative embodiment shown in FIG. 10, the perturbations are biconic lenses and the light beam portions 402-405 are brought to focus or very near focus in a plane 407. The light beam portions 402-405 are very similar to the light beam portions 163-166, respectively, shown in FIG. 6.

Figure 11:
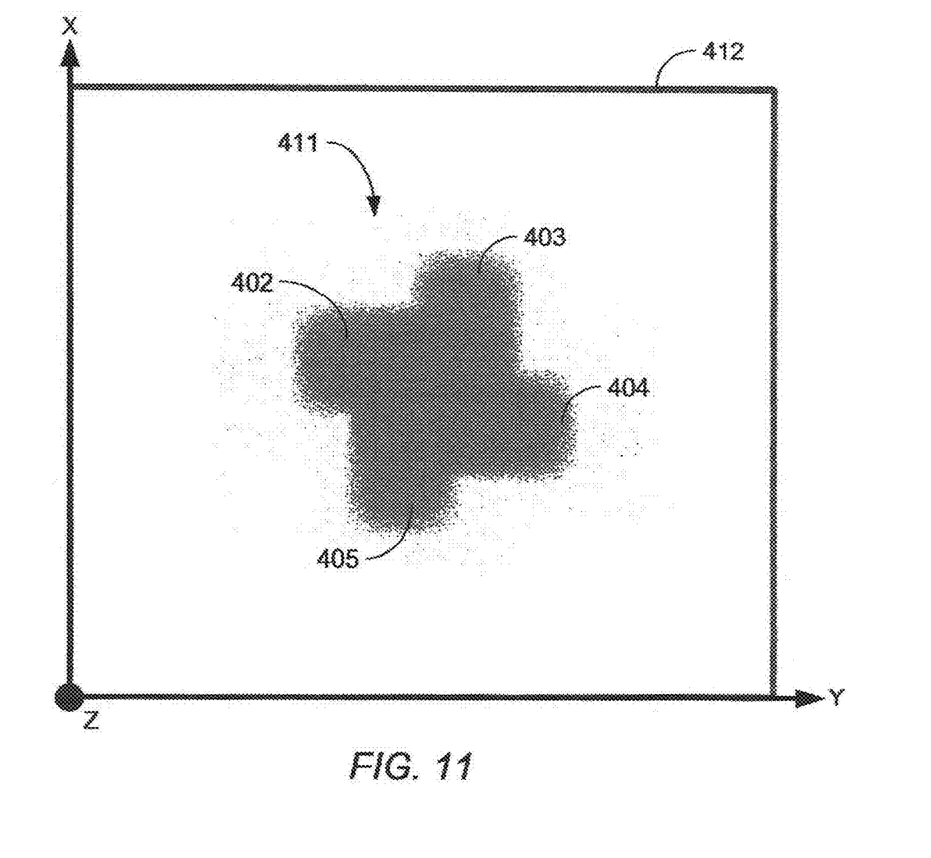
FIG. 11 illustrates a front plan view of a complex light beam shape formed by bringing the four light beam portions shown in FIG. 10 to near focus in a preselected plane.

FIG. 11 illustrates a front plan view of a complex light beam shape 411 formed by bringing the four light beam portions 402-405 shown in FIG. 10 to near focus in a preselected plane 412. In plane 412, the light beam portions 402-405 are farther from focus than they are in plane 407. In this example, the plane 412 is in front of the end face 309 of the optical fiber 311, i.e., in between the end face 309 and focusing lens 317. In the plane 412, the light beam portions 402 and 404 only partially overlap one another and the light beam portions 403 and 405 only partially overlap one another. This partial overlapping is similar to what is shown in FIG. 7. Because the biconic lenses corresponding to the perturbations 302 are at different spatial locations in the flat optical surface 301, the respective light beam portions 402-405 are formed at different locations in the plane 412 at near focus. The resulting complex light beam shape 411 is predetermined to have spatial and angular distributions at the fiber end face 309 that match enough of the light modes of the optical fiber 311 to achieve good forward optical coupling efficiency and to reduce back reflection into the laser light source 308, thereby decreasing RIN. Thus, the size, shape and spatial arrangement of the perturbations 302 on the flat optical surface 301 are preselected to obtain a complex light beam shape at a preselected plane in order to match spatial and angular distributions of the optical fiber light modes and to reduce back reflection in order to decrease RIN.

It should be noted that the invention has been described with reference to a few representative embodiments for the purposes of demonstrating the principles and concepts of the invention. For example, while the representative embodiments describe particular complex light beam shapes 161, 171, 401 and 411 at a predetermined plane at or near focus, respectively, the inventive principles and concepts are not limited to these particular complex light beam shapes. Persons of skill in the art will understand, in view of the description provided herein, the manner in which a perturbed flat surface can be designed and manufactured to achieve almost any desired complex light beam shape tailored to match the angular and spatial distributions of light modes of the optical fiber with which the perturbed flat surface is being used. Therefore, the inventive principles and concepts are not limited to the representative embodiments, as will be understood by persons of ordinary skill in the art in view of the description provided herein. Those skilled in the art will understand that modifications may be made to the embodiments described herein and that all such modifications are within the scope of the invention.

What is claimed is:

1. An optical coupling system for use in an optical communications module for coupling light between a light source and an end face of an optical waveguide, the optical coupling system comprising:

a flat surface positioned along an optical pathway of the optical coupling system, the flat surface having an inner side and an outer side, wherein a light beam emitted by the light source and propagating along the optical pathway in a first direction is incident on the inner side; and a plurality of perturbations disposed on the outer side of the flat surface, each perturbation having a localized sagittal (sag) profile that provides a localized refractive effect on a portion of the light beam that is incident on the flat surface to form a respective light beam portion at a predetermined plane, wherein the perturbations are shaped, sized and positioned such that a predetermined aggregated refractive effect of partially or fully overlapping all of the respective light beam portions at the predetermined plane forms a complex light beam shape at the predetermined plane that is different in shape from respective shapes of each of the respective light beam portions, the complex light beam shape being preselected to match one or more light modes of the light beam emitted by the light source with one or more light modes of the optical waveguide.

2. The optical coupling system of claim 1, wherein the complex light beam shape is also preselected to reduce back reflections of the light beam from the end face of the optical waveguide into the light source.

3. The optical coupling system of claim 1, wherein said plurality of perturbations are positioned in an M-by-N array on the outer side of the flat surface, where M and N are positive integers that are greater than or equal to 2.

4. The optical coupling system of claim 1, wherein each of the perturbations has a predetermined width in a second direction that is transverse to the first direction, the predetermined width being sufficiently great that the perturbations have no diffractive effect on the light beam that is incident on the flat surface.

5. The optical coupling system of claim 4, wherein the predetermined width ranges from about $60\lambda$ to $400\lambda$, where $\lambda$ is the operating wavelength of the optical communications device in which the optical coupling system is used.

6. The optical coupling system of claim 5, wherein each of the perturbations has a predetermined maximum height equal to a distance from the outer side of the flat surface in a third direction that is normal to the outer side of the flat surface, the predetermined maximum height ranging from 0 to about $10\lambda$.

7. The optical coupling system of claim 6, wherein the optical coupling system is formed as a unitary, molded plastic piece part having the flat surface integrally formed therein.

8. The optical coupling system of claim 7, wherein the predetermined width is equal for all of the perturbations and wherein each of the perturbations is separated from an adjacent one of the perturbations by a flat surface portion, and wherein the flat surface portions all have an equal width in the second direction.

9. The optical coupling system of claim 8, wherein the predetermined maximum height is equal for all of the perturbations.

10. The optical coupling system of claim 9, wherein the perturbations extend only over a portion of the outer side of the flat surface that intersects the optical pathway.

11. The optical coupling system of claim 7, wherein the predetermined width is unequal for at least some of the perturbations and wherein each of the perturbations is separated from an adjacent one of the perturbations by a flat surface portion, and wherein at least some of the flat surface portions have unequal widths in the second direction.

12. The optical coupling system of claim 11, wherein the predetermined maximum height is unequal for at least some of the perturbations.

13. The optical coupling system of claim 1, wherein each sag profile varies over two directions that are orthogonal to one another.

14. The optical coupling system of claim 1, wherein the flat surface comprises an air-to-material interface of the optical coupling system such that the outer side of the flat surface is in contact with air and the inner side of the flat surface is inside of material comprising the optical coupling system, wherein the light beam propagating along the optical pathway in the first direction passes from the air into the material at the air-to-material interface.

15. The optical coupling system of claim 1, wherein the flat surface comprises a material-to-air interface of the optical coupling system such that the outer side of the flat surface is in contact with air and the inner side of the flat surface is inside of material comprising the optical coupling system, wherein the light beam propagating along the optical pathway in the first direction passes from the material into the air at the material-to-air interface.

16. The optical coupling system of claim 1, wherein the flat surface comprises a flat total internal reflection (TIR) surface, and wherein a light beam propagating along the optical pathway in the first direction is incident on the inner side of the flat TIR surface and is reflected by the flat TIR surface in a second direction that is at a non-zero-degree angle to the first direction.

17. A method for launching light produced by a light source onto an end face of an optical waveguide, the method comprising:
    with a light source, producing a light beam; and
    with an optical coupling system, receiving the light beam and guiding the light beam in a first direction along an optical pathway of the optical coupling system and causing the light beam to be incident on a flat surface of the optical coupling system, wherein a plurality of perturbations are disposed on an outer side of the flat surface, each perturbation having a localized sagittal (sag) profile that provides a localized refractive effect on a portion of the light beam that is incident on the flat surface to form a respective light beam portion at a predetermined plane, wherein the perturbations are shaped, sized and positioned such that a predetermined aggregated refractive effect of partially or fully overlapping all of the respective light beam portions at the predetermined plane forms a complex light beam shape at the predetermined plane that is different in shape from a respective shape of each of the respective light beam portions, the complex light beam shape being preselected to match one or more light modes of the light beam emitted by the light source with one or more light modes of the optical waveguide.

18. The method of claim 17, wherein the complex light beam shape is also preselected to reduce back reflections of the light beam from the end face of the optical waveguide into the light source.

19. The method of claim 17, wherein each of the perturbations has a predetermined width in a second direction that is transverse to the first direction, the predetermined width ranging from about $60\lambda$ to $400\lambda$, where $\lambda$ is the operating wavelength of the optical communications device in which the optical coupling system is used.

20. The method of claim 19, wherein each of the perturbations has a predetermined maximum height equal to a distance from the outer side of the flat surface in a direction that is normal to the outer side of the flat surface, the predetermined maximum height ranging from 0 to about $10\lambda$.

* * * * *